Patented June 24, 1952

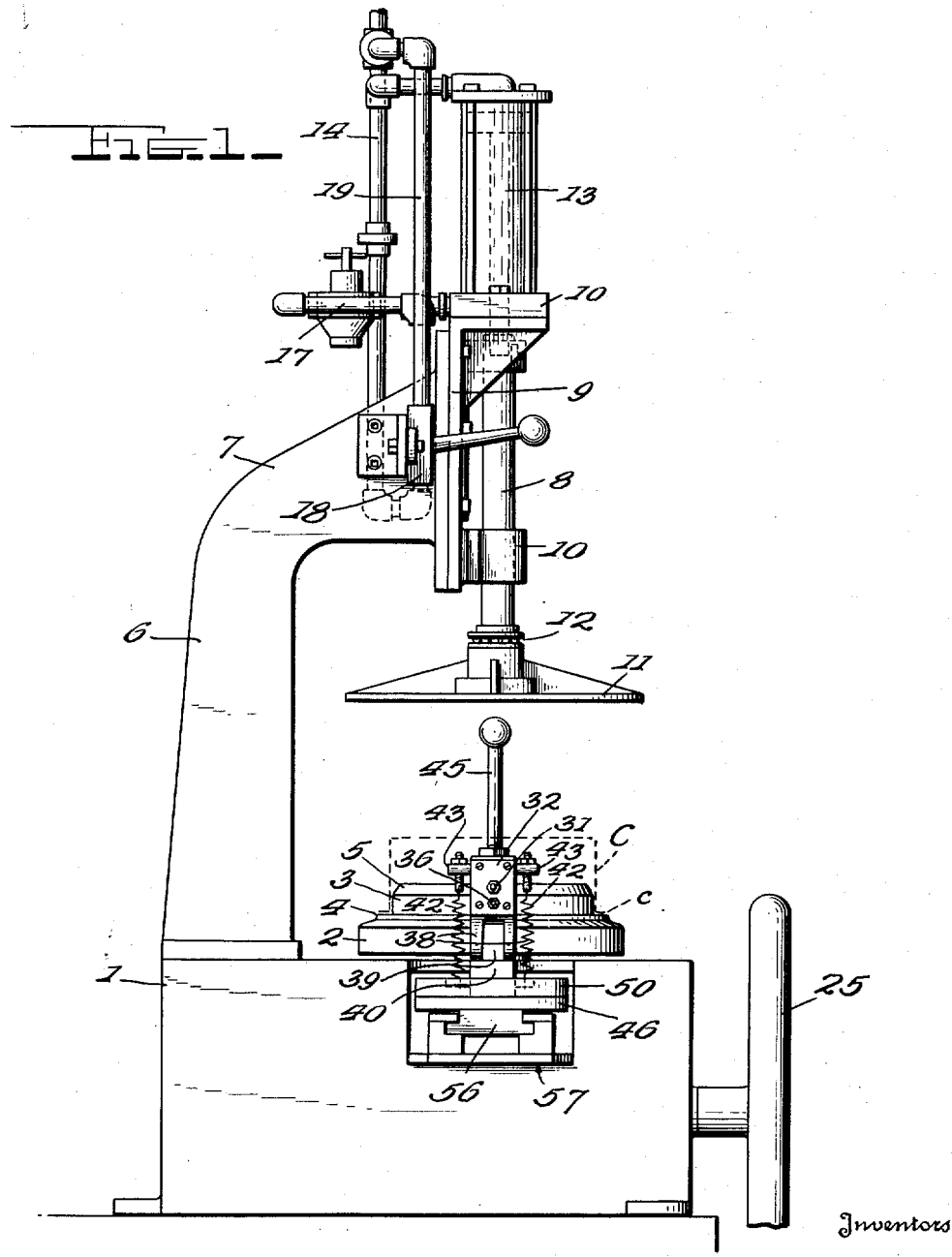

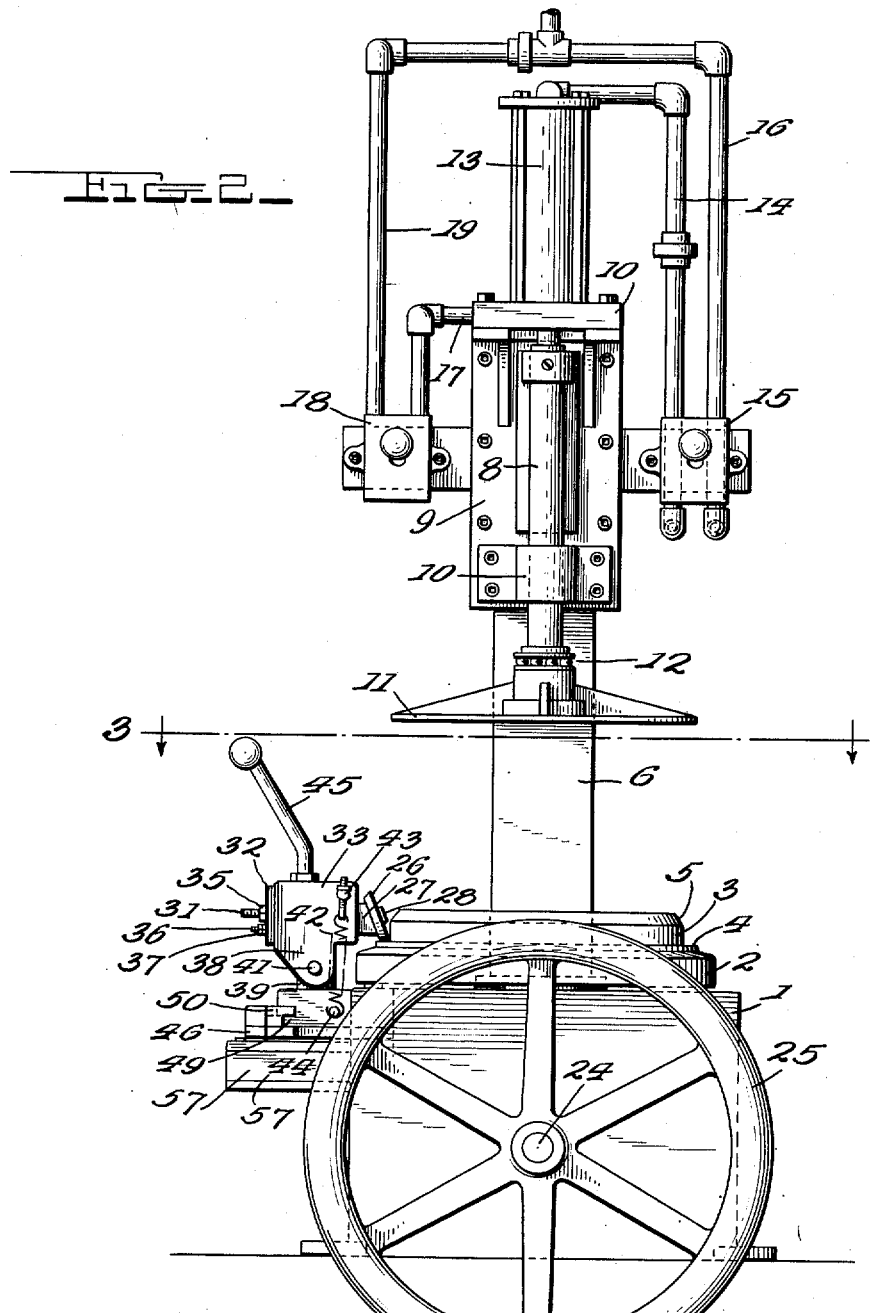

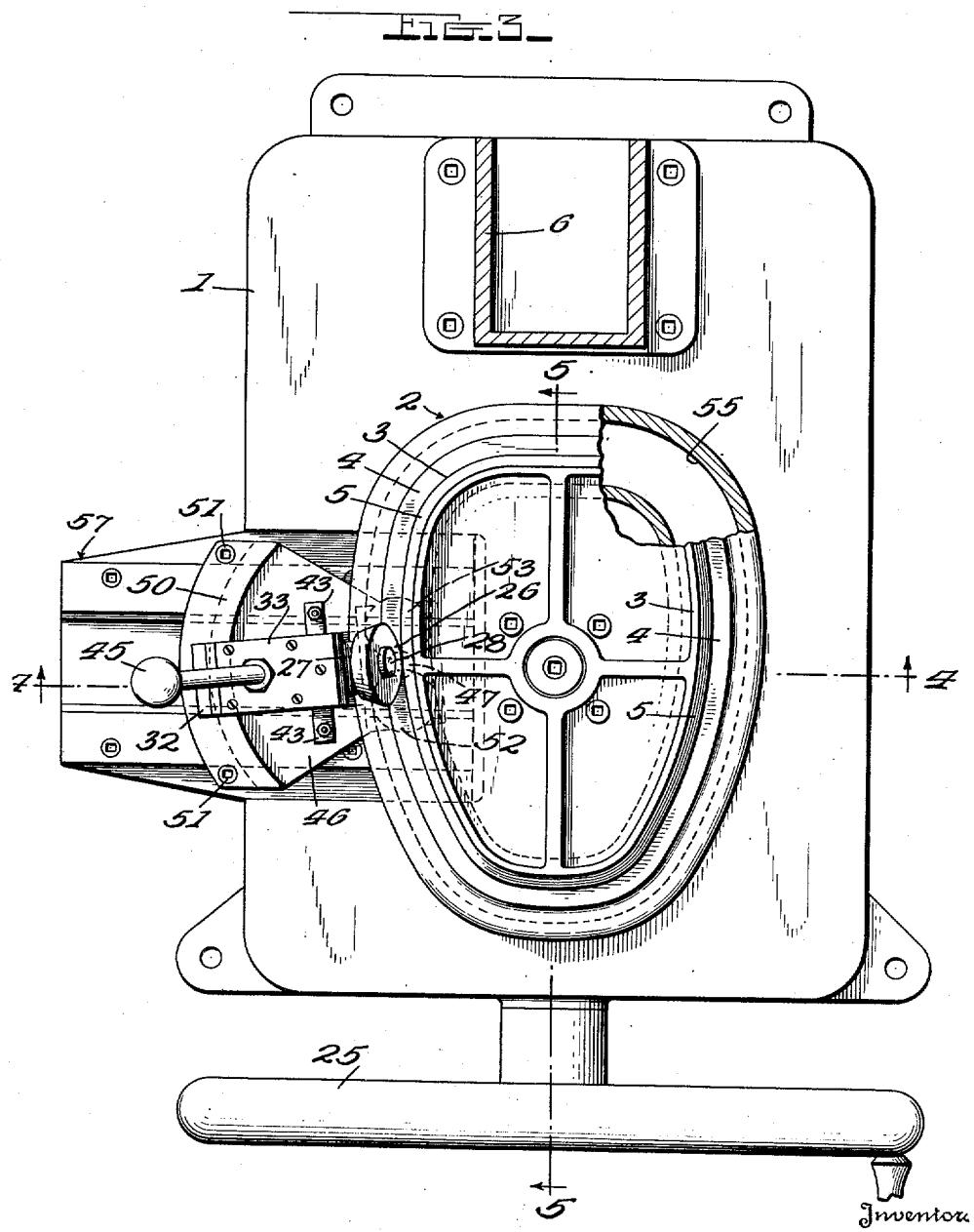

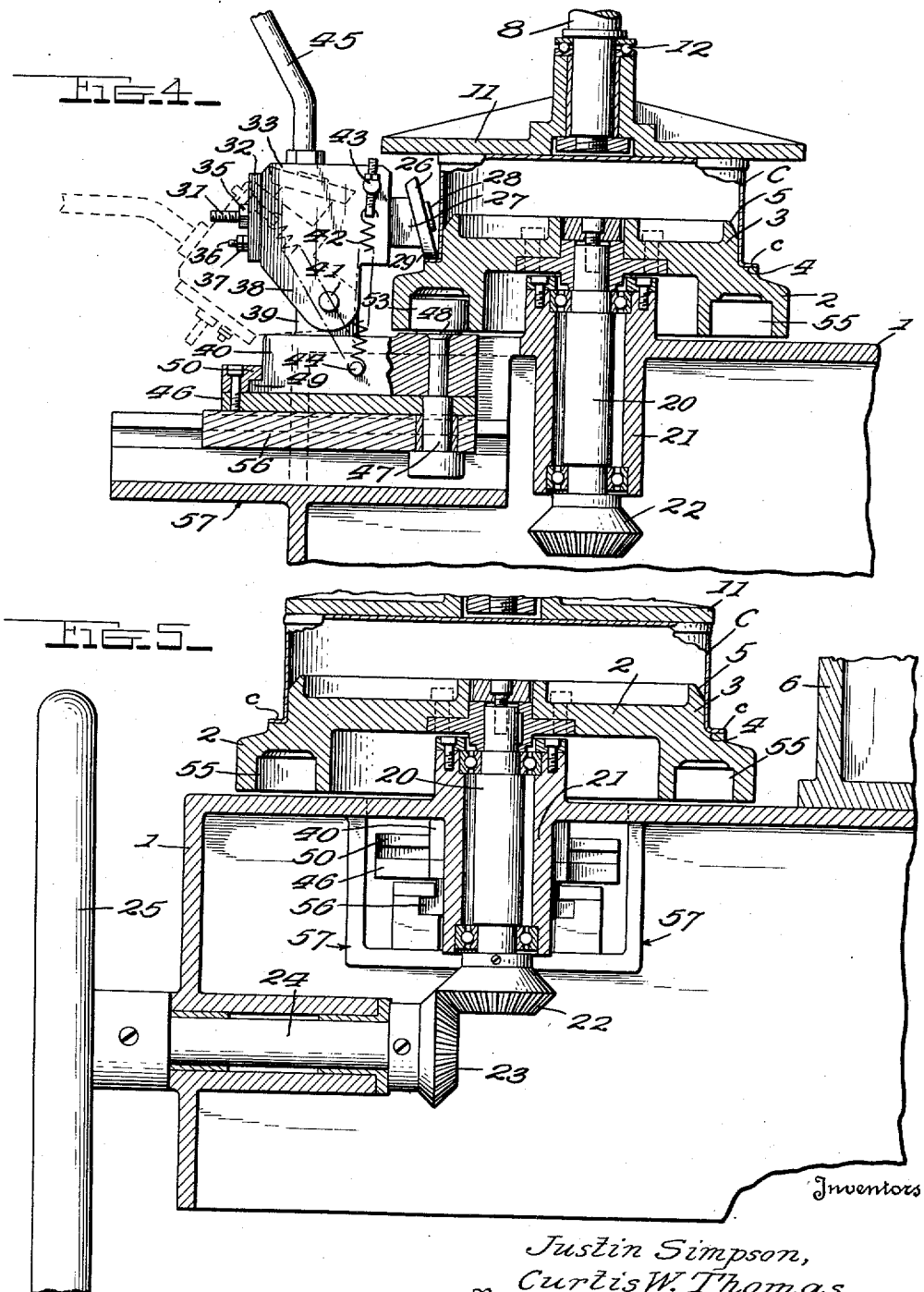

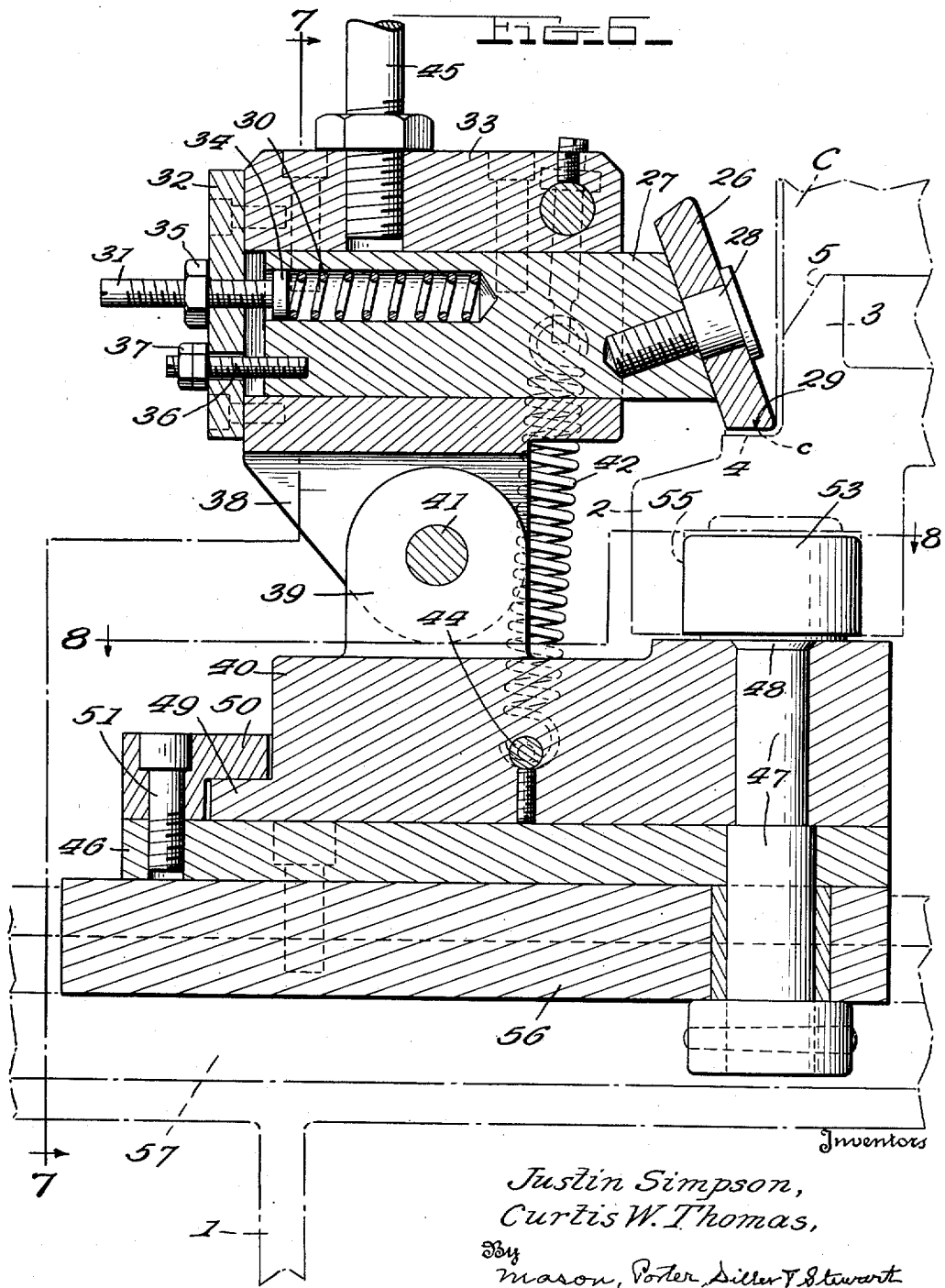

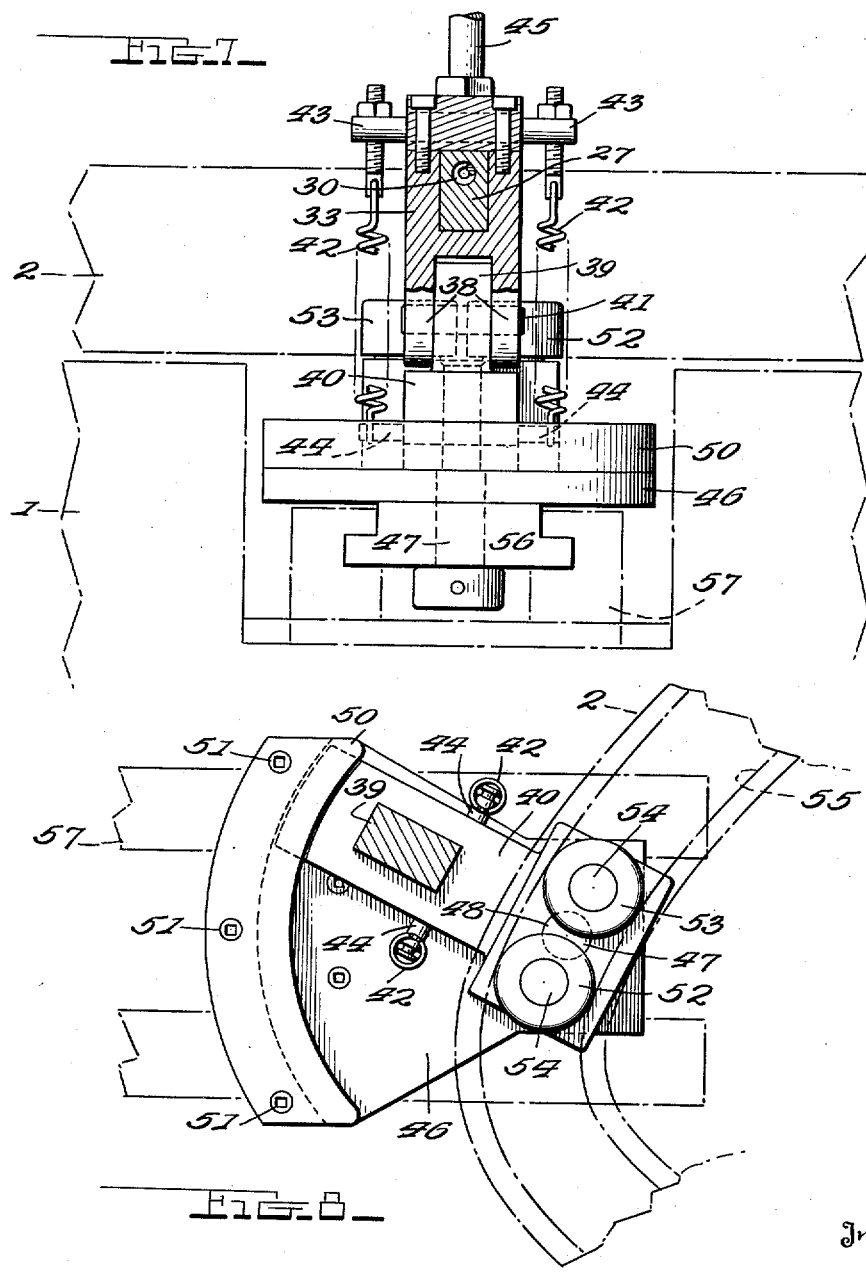

2,601,641

UNITED STATES PATENT OFFICE 2,601,641

MACHINE FOR RESHAPING THE FLANGE OF IRREGULAR SHAPED CANS

Justin Simpson, Elmhurst, and Curtis W. Thomas, Chicago, Ill., assignors to Continental Can Company, Inc., New York, N. Y., a corporation of New York Application April 25, 1949, Serial No. 89,544

5 Claims. (Cl. 153—39)

1

The invention relates to new and useful improvements in a machine for reshaping the flange of an irregular shaped can.

The object of the invention is to provide a flange reshaping machine for irregular shaped cans wherein the flange of the can is progressively pressed into intimate contact with a rotatable chuck and supporting ledge shaped to conform to the inner wall of the can and a normal flange thereon for removing bends and dents from the flange.

A further object of the invention is to provide a flange reshaping machine of the above type wherein a roller is progressively pressed into contact with the flange while on the supporting ledge of a rotatable chuck for removing bends and dents from the flange.

A still further object of the invention is to provide a flange reshaping machine of the above type wherein the roller is shifted in and out in conformity with the shape of the can.

A still further object of the invention is to provide a machine of the above type wherein the roller is not only shifted in and out to conform to the shape of the irregular can but the support for the roller is also shifted so as to maintain the axis of rotation of the roller substantially at right angles to the wall of the can in the region where the roller is in contact with the flange of the can.

Still another object of the invention is to provide a machine of the above type wherein the can is forced onto the chuck and the flange with the can against the ledge on the chuck by a pad contacting with the can, which pad is forced into and out of contact with the can by manually controlled fluid means.

These and other objects will in part be obvious and will in part be hereinafter more fully described.

In the drawings, which show by way of illustration one embodiment of the invention:

Figure 1 is a side view of a machine embodying the improvements;

Figure 2 is a front view of the same;

Figure 3 is a sectional view on the line 3—3 of Figure 2;

Figure 4 is a sectional view on the line 4—4 of Figure 3;

2

Figure 5 is a sectional view on the line 5—5 of Figure 3;

Figure 6 is an enlarged vertical sectional view through the roller, the means for supporting the roller; also the means for shifting the roller so as to position it in conformity with the irregular shape of the can;

Figure 7 is a sectional view on the line 7—7 of Figure 6; and

Figure 8 is a sectional view on the line 8—8 of Figure 6.

The invention has to do with a machine for reshaping the flange on an irregular shaped can body. The machine, as illustrated in the accompanying drawings, includes a supporting base 1, on which is rotatably mounted a chuck 2, which chuck includes an upstanding portion 3, which is shaped to conform to the shape of the irregular can and is dimensioned so as to snugly fit within the open mouth of the can. The chuck also is provided with a projecting ledge 4, the surface of which merges into the outer surface of the upstanding portion 3. These surfaces conform to the normal shape of the inner wall of the can and the flange and the connecting portions therebetween.

The can indicated at C is inverted and placed over the chuck. The extreme upper part of the upstanding portion 3 is tapered as indicated at 5, so that the irregular shaped can can be forced down over this tapered portion onto the chuck and the flange brought into contact with the ledge.

Mounted on the supporting base 1 is the standard 6. At the upper end of the standard is the laterally projecting arm 7, in which a rod 8 is mounted for reciprocation. Said arm carries a bracket 9 provided with sleeves 10, 10 in which this rod reciprocates. At the lower end of the rod is a pad 11 which is attached to the rod 8 through a ball bearing connection 12 so that the pad is free to rotate on the lower end of the rod. At the upper end of the rod is a piston which reciprocates in a cylinder 13. Air or other fluid means is directed to the upper end of the cylinder through a pipe 14. This pipe 14 is connected through a hand operated valve device 15 which in turn is connected to a pipe 16 leading to a source of fluid means under pressure. A pipe 17 is connected to the other end of the cylinder and also to a hand controlled valve 18, which in turn is connected to a pipe 19 leading to the same source of fluid supply. When the valve 15 is operated so as to connect the fluid supplied to the upper end of the cylinder, the pad 11 will be moved downwardly. When this valve is operated so as to disconnect the upper end of the cylinder with the fluid supplied under pressure, then this pipe 14 and the upper end of the cylinder will be in communication with the atmosphere. When the valve 18 is operated so as to connect the lower end of the cylinder to the fluid supplied under pressure, then the pad will be raised and likewise when this valve is operated so as to disconnect the lower end of the cylinder with the fluid supply, then the pipe 17 will be in communication with the atmosphere. This is an ordinary hand controlled fluid operated mechanism for raising and lowering the pad 11, and further description thereof is not thought necessary.

It often occurs that the flange and can at the open end thereof becomes dented or bent during the shipping of the container to the packer or in the handling of the same. This reflanging machine is used by the packer to straighten the flange or remove all dents and bends therefrom so as to facilitate the attachment of a cover to the can for hermetically sealing the can. The can with the dented or bent flange is inverted, as noted above, and placed on the chuck so that the irregular shape of the can fits the irregular shape of the chuck. Then the pad 11 is lowered into contact with the bottom end of the can and the can is forced down onto the chuck, bringing the flange into contact with the ledge 4 on the chuck. The chuck 2 is secured to the upper end of a shaft 20. This shaft is mounted in suitable bearings in a sleeve 21 formed as a part of the supporting base 1. The shaft 20 carries a bevel gear 22 at the lower end thereof which meshes with a bevel gear 23 carried by a shaft 24 to which is attached a hand wheel 25.

The flange is operated upon progressively by a roller 26. This roller 26 is secured to a slide 27 by means of a stud 28. The periphery of the roller is shaped as indicated at 29 so as to conform to the shape of the supporting ledge and is of a width so that it extends from the outer edge of the ledge to the inner edge thereof where it merges into the vertical wall of the upstanding portion of the chuck. The outer portion of the periphery of the roller is curved to conform to the normal curvature of the body wall where it joins and merges into the flange. The flange of the can C is indicated at c in the drawings.

The slide 27 is provided with a bore in which is located a coil spring 30. A threaded rod 31 makes threaded engagement with the plate 32 attached to the block 33 in which the slide 27 is located. This rod 31 carries a head 34 which abuts against the spring and normally tends to yieldingly force the roller toward the upstanding portion of the chuck. The rod 31 can be adjusted and is held in adjusted position by means of a lock nut 35. There is a second rod 36 threaded into the slide 27, and this rod passes freely through the plate 32 and carries stop nuts 37 on the outer end thereof. These stop nuts are adjusted so that the spring will move the slide so that the roller will contact with the body wall and flange in the region where the body wall merges into the flange. The block 33 in which the slide 27 is mounted is provided with spaced depending lugs 38—38 and these lugs straddle an upstanding lug 39 carried by a base member 40. A pivot pin 41 extends through the lugs so that the block 33 can swing to carry the roller from operative position as shown in full lines in Figures 4 and 6 to an inoperative position as shown in broken lines in Figure 4. Coil springs 42—42 are attached at their upper ends to pins 43—43 projecting from the block 33. These coil springs are attached at their lower ends to anchor pins 44 mounted on the base 40. When the roller is in operative position the springs are disposed at the right hand side of the pivot pin 41 and when the roller is in its inoperative position as shown in Figure 4 they are at the opposite side of the pin, or substantially so, so that the block 33 may be swung from one position to another by handle member 45 and will remain either in the inoperative position or in the operative position to which it is swung. This enables the roller to be moved away from the chuck so that the can may be placed on the chuck and the flange of the can forced down against the supporting ledge thereof. The base member 40 is mounted on a supporting plate 46. Extending up through the supporting plate 46 is a pivot pin 47. The pivot pin terminates at the upper side of the supporting base as indicated at 48. The outer side of the supporting base 40 has an extension 49 which engages beneath an overhanging bar 50 which is secured to the supporting plate 46 by means of bolts 51—51. This provides a supporting means for the base member on which the roller 26 is mounted so that said base member can shift angularly about the pivot pin 47. The inner end of the supporting base member 40 is provided with a rectangular enlargement and mounted on this rectangular enlargement are rollers 52 and 53. These rollers are carried by supporting studs 54—54 respectively rigidly carried by the base member 40. These rollers 52 and 53 engage a cam groove 55 formed in the underface of the chuck 2. This cam groove 55 is shaped to conform to the contour of the irregular shaped chuck and can mounted thereon.

The two rollers running in the cam groove will shift the supporting base 40 on the pivot pin 47 as the chuck rotates so that a vertical plane through the axis of the roller 26 will lie substantially at right angles to the outer wall of the can body in the region where the roller contacts with the flange. This will always keep the flange shaping roller 26 positioned so that it can roll along on the flange retaining its position close to the body wall as shown in Figure 6.

The supporting plate 46 is bolted to a slide 56. The slide 56 is mounted for reciprocation in a supporting bracket 57 formed as a part of the main supporting base 1.

As the rollers 52 and 53 follow along the cam groove they will move toward and from the center of rotation of the chuck and this will cause the slide 56 to move in and out on the bracket 57. This in and out movement of the slide 56 will cause the roller 26 to move in and out and thus be properly positioned to contact with the flange of the can.

In the operation of the machine the can body with a bent and dented flange is placed over the chuck and then the valve 15 operated so as to admit air or other actuating fluid under pressure to move the piston downwardly carrying the pad into contact with the bottom of the can and thus force the can down on the chuck until the flange is pressed with the force of the fluid pressure against the ledge on the chuck. Before inserting the can over the chuck the handle 45 was swung outwardly, moving the roller to the position shown in broken lines in Figure 4. After the can has been positioned then the handle is actuated to move the roller back into operative position as shown in Figures 4 and 6. The roller now contacts the flange on the can and the operator will, through the hand wheel 25, rotate the chuck. As the chuck rotates, the roller will progressively engage the flange and, through springs 42—42, will force the flange into intimate contact with the supporting ledge on the chuck. This will remove all dented and bent portions from the flange. As the chuck rotates, the rollers 52 and 53 will move the roller 26 in and out so as to position it on the flange as the flange of the irregular shaped can moves beneath the same. The same rollers 52 and 53 will also shift the supporting base for the roller about the pivot pin 47 so as to maintain the axis of the roller 26 in a vertical plane substantially at right angles to the outer wall of the can body in the region where the roller contacts with the flange. In an irregular shaped can it is very essential to keep the roller in this position in order that it may run truly along the flange with the inner peripheral edge of the roller fitting into the curved portion between the body wall and the flange.

After the straightening of the flange has been completed then the handle 45 is grasped and the roller 26 moved to inoperative position. The valve 18 is then moved to direct the fluid into the lower end of the cylinder for raising the pad to its upper position so that the can may be lifted off the chuck.

It is obvious that many changes may be made in the details of construction and the arrangement of the parts without departing from the spirit of the invention as set forth in the appended claims.

We claim:

1. A can flange reshaping machine comprising a rotatable chuck shaped to conform to the interior wall of an irregular shaped can and having a laterally projecting ledge at the lower end thereof on which the flange of the can rests when forced down over the chuck, a supporting bracket adjacent the chuck, a slide mounted thereon and movable radially of the chuck, a base member mounted on said slide, a block pivotally supported by said base member, a slide mounted in said block, a roller pivotally mounted on the slide, yielding means for moving said slide to a set position relative to the chuck, said roller being mounted in a plane inclined to the chuck and having a peripheral face adapted to contact with the flange all the way from the outer edge of the flange to the body wall of the can, spring means for yieldingly pressing said roller against the flange for reforming the same into intimate contact with the ledge and means for moving said first named slide in and out in conformity with the shape of the can whereby the roller will follow the irregular shape of the flange.

2. A can flange reshaping machine comprising a rotatable chuck shaped to conform to the interior wall of an irregular shaped can and having a laterally projecting ledge at the lower end thereof on which the flange of the can rests when forced down over the chuck, a supporting bracket adjacent the chuck, a slide mounted thereon and movable radially of the chuck, a supporting base pivotally mounted on said slide, a block pivotally mounted on said supporting base, a roller pivotally mounted on said block for rotation in a plane at an acute angle to the wall of the chuck and having a periphery shaped to conform to the ledge of the chuck, spring means associated with said chuck for yieldably forcing said roller against the flange of the can for reforming the same into intimate contact with the ledge, and means for moving the slide in and out in conformity to the shape of the can and for swinging said base on its pivot so as to maintain the axis of the roller substantially at right angles to the wall of the can in the region where the roller is in contact with the flange.

3. A can flange reshaping machine comprising a chuck shaped to conform to the interior wall of an irregular shaped can and having a laterally projecting ledge at the lower end thereof on which the flange of the can rests when forced down over the chuck, a supporting bracket adjacent the chuck, a slide mounted thereon and movable radially of the chuck, a support pivotally mounted on the slide, a flange engaging roller mounted on said pivotal support, said chuck having a cam groove conforming to the irregular shape of the can, a pair of rollers mounted on said pivotal support and adapted to engage said cam groove for moving the slide in and out in conformity with the shape of the can and for shifting said support so as to maintain the axis of the flange engaging roller substantially at right angles to the wall of the can in the region where the roller is in contact with the flange.

4. A can flange reshaping machine comprising a chuck shaped to conform to the interior wall of an irregular shaped can and having a laterally projecting ledge at the lower end thereof on which the flange of the can rests when forced down over the chuck, a supporting bracket adjacent the chuck, a slide mounted thereon and movable radially of the chuck, a support pivotally mounted on the slide, a flange engaging roller mounted on said pivotal support, said chuck having a cam groove conforming to the irregular shape of the can, a pair of rollers mounted on said pivotal support and adapted to engage said cam groove for moving the slide in and out in conformity with the shape of the can and for shifting said support so as to maintain the axis of the flange engaging roller substantially at right angles to the wall of the can in the region where the roller is in contact with the flange, said support for the flange engaging roller including a base member and a block pivotally mounted thereon, said roller being mounted on said block, and means for swinging said block on its pivotal support for moving said flange engaging roller to inoperative or operative positions.

5. A can flange reshaping machine comprising a chuck shaped to conform to the interior wall of an irregular shaped can and having a laterally projecting ledge at the lower end thereof on which the flange of the can rests when forced down over the chuck, a supporting bracket adjacent the chuck, a slide mounted thereon and movable radially of the chuck, a support pivotally mounted on the slide, a flange engaging roller mounted on said pivotal support, said chuck having a cam groove conforming to the irregular shape of the can, a pair of rollers mounted on said pivotal support and adapted to engage said cam groove for moving the slide in and out in conformity with the shape of the can and for shifting said support so as to maintain the axis of the flange engaging roller substantially at right angles to the wall of the can in the region where the roller is in contact with the flange, said support for the flange engaging roller including a base member and a block pivotally mounted thereon, said roller being mounted on said block and means for swinging said block on its pivotal support for moving said flange engaging roller to inoperative or operative positions, and coil springs connected to said block and said base member and so disposed relative to the pivotal support for the block as to hold the flange engaging roller in operative and inoperative positions.

JUSTIN SIMPSON.
CURTIS W. THOMAS.

REFERENCES CITED

The following references are of record in the file of this patent:

UNITED STATES PATENTS

| Number | Name | Date |
|---|---|---|
| 318,785 | Moore | May 26, 1885 |
| 912,377 | Hutchinson | Feb. 16, 1909 |
| 1,961,832 | Scruggs | June 5, 1934 |